(12) United States Patent
Jaradi et al.

(10) Patent No.: US 11,014,522 B2
(45) Date of Patent: May 25, 2021

(54) DUAL-CHAMBERED SIDE AND FRONT AIRBAG

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/595,716

(22) Filed: Oct. 8, 2019

(65) Prior Publication Data

US 2021/0101558 A1 Apr. 8, 2021

(51) Int. Cl.
| | | |
|---|---|---|
| *B60R 21/233* | (2006.01) | |
| *B60R 21/205* | (2011.01) | |
| *B60R 21/231* | (2011.01) | |
| *B60R 21/00* | (2006.01) | |

(52) U.S. Cl.
CPC .......... *B60R 21/233* (2013.01); *B60R 21/205* (2013.01); *B60R 21/23138* (2013.01); *B60R 2021/0004* (2013.01); *B60R 2021/0006* (2013.01); *B60R 2021/0009* (2013.01)

(58) Field of Classification Search
CPC .... B60R 2021/0004; B60R 2021/0006; B60R 2021/0009
See application file for complete search history.

(56) References Cited

U.S. PATENT DOCUMENTS

| | | | |
|---|---|---|---|
| 5,470,103 A * | 11/1995 | Vaillancourt | ......... B60R 21/214 |
| | | | 280/730.1 |
| 6,808,198 B2 | 10/2004 | Schneider et al. | |
| 9,227,587 B1 | 1/2016 | Belwafa et al. | |
| 9,327,669 B2 * | 5/2016 | Jaradi | ...................... B60R 21/08 |
| 9,421,935 B2 | 8/2016 | Fukawatase et al. | |
| 9,505,372 B2 | 11/2016 | Yamada et al. | |
| 9,566,929 B1 | 2/2017 | Belwafa et al. | |
| 9,902,361 B2 * | 2/2018 | Lee | ........................ B60R 21/231 |
| 10,246,042 B2 | 4/2019 | Sumiya | |
| 10,272,868 B2 * | 4/2019 | Jaradi | .................... B60R 21/237 |
| 10,279,770 B2 * | 5/2019 | Faruque | .............. B60R 21/2342 |
| 10,308,207 B2 | 6/2019 | Ohno et al. | |
| 10,315,609 B2 * | 6/2019 | Thomas | .............. B60R 21/2338 |
| 10,471,923 B2 * | 11/2019 | Jimenez | ............... B60R 21/0136 |
| 2016/0311393 A1 * | 10/2016 | Smith | .................... B60R 21/232 |
| 2018/0037188 A1 | 2/2018 | Ohno et al. | |
| 2018/0354450 A1 | 12/2018 | Yamada et al. | |

* cited by examiner

*Primary Examiner* — Faye M Fleming
(74) *Attorney, Agent, or Firm* — Frank A. MacKenzie; Bejin Bieneman PLC

(57) ABSTRACT

A restraint system includes an A pillar, a dash extending in a cross-vehicle direction from the A pillar, a door extending in a vehicle-rearward direction from the A pillar, and an airbag mounted to the A pillar and inflatable to an inflated position. The airbag includes a side chamber and a front chamber. The side chamber is elongated along the door when the airbag is in the inflated position, and the front chamber is elongated along the dash when the airbag is in the inflated position.

17 Claims, 5 Drawing Sheets

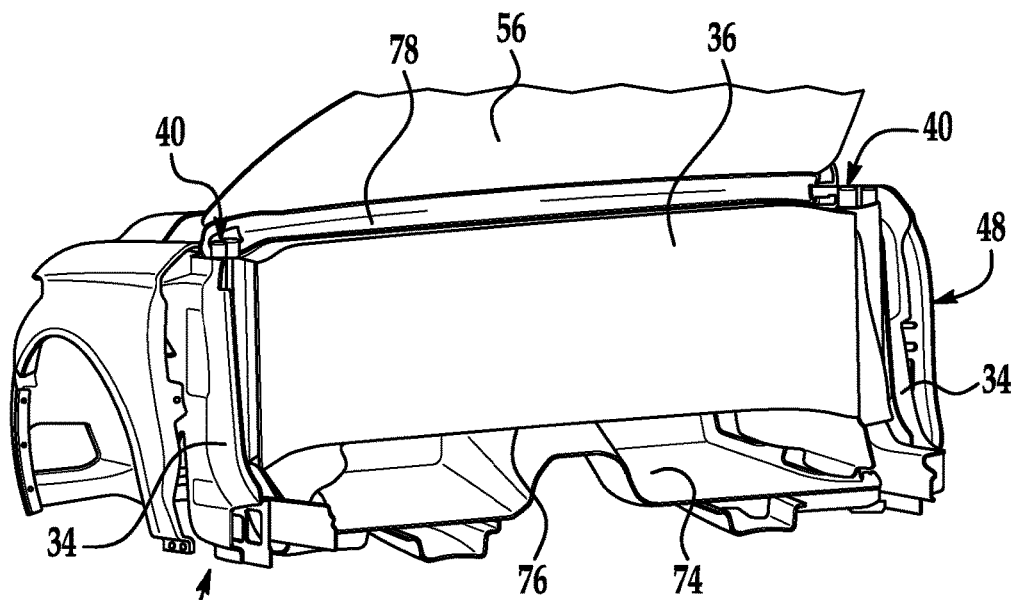
FIG. 3
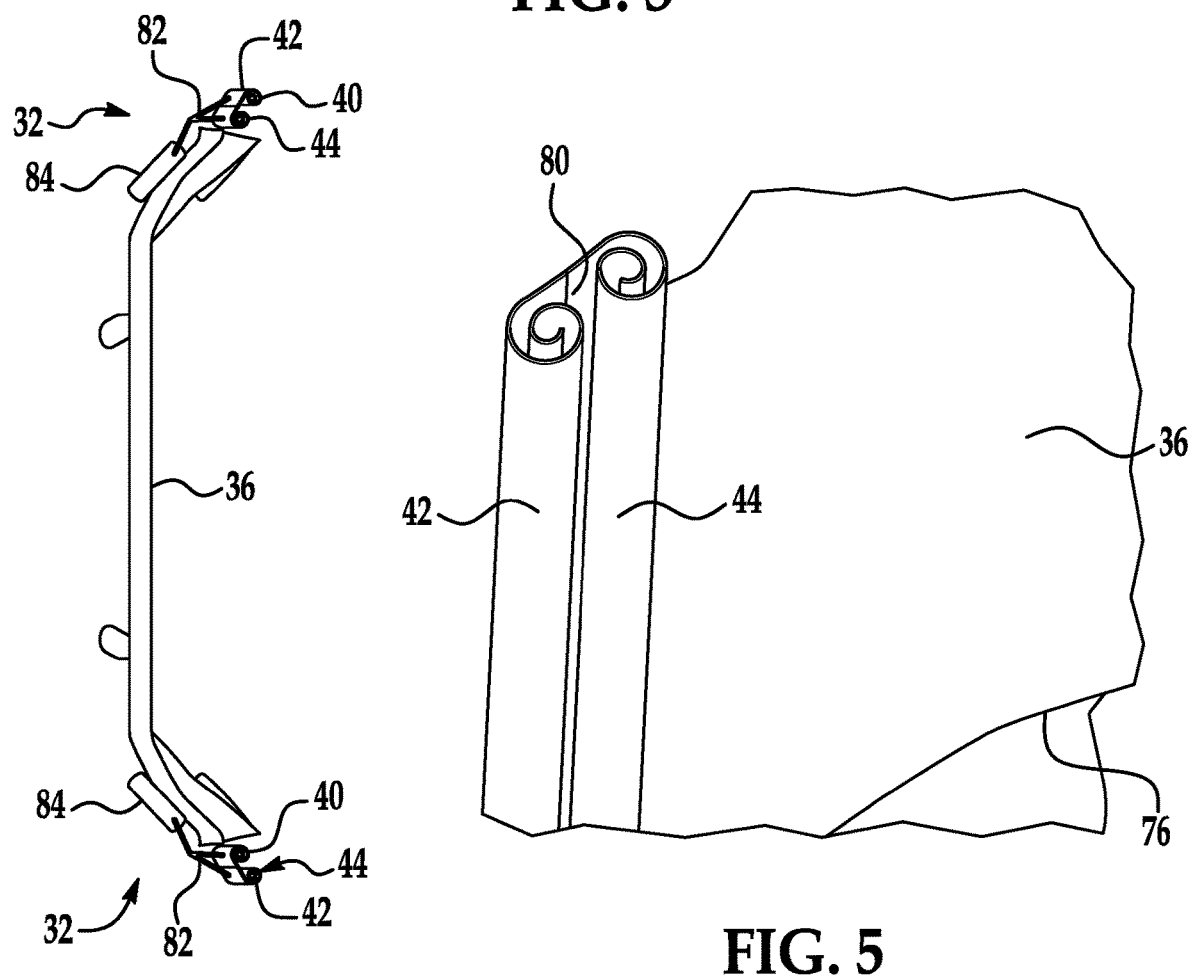
FIG. 4
FIG. 5

US 11,014,522 B2

DUAL-CHAMBERED SIDE AND FRONT AIRBAG

BACKGROUND

Vehicles are typically equipped with airbags. In the event of an impact, inflators activate and provide inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the top of the dash in a vehicle-forward direction from the front passenger seat, and side curtain airbags mounted in the roof rails above the doors.

BRIEF DESCRIPTION OF THE DRAWINGS

FIG. 3 is a rear perspective view of a front of the passenger cabin.
FIG. 4 is a top view of a dash of the vehicle.
FIG. 5 is a perspective view of a portion of an airbag of the vehicle in an uninflated position.

DETAILED DESCRIPTION

Figure 1:
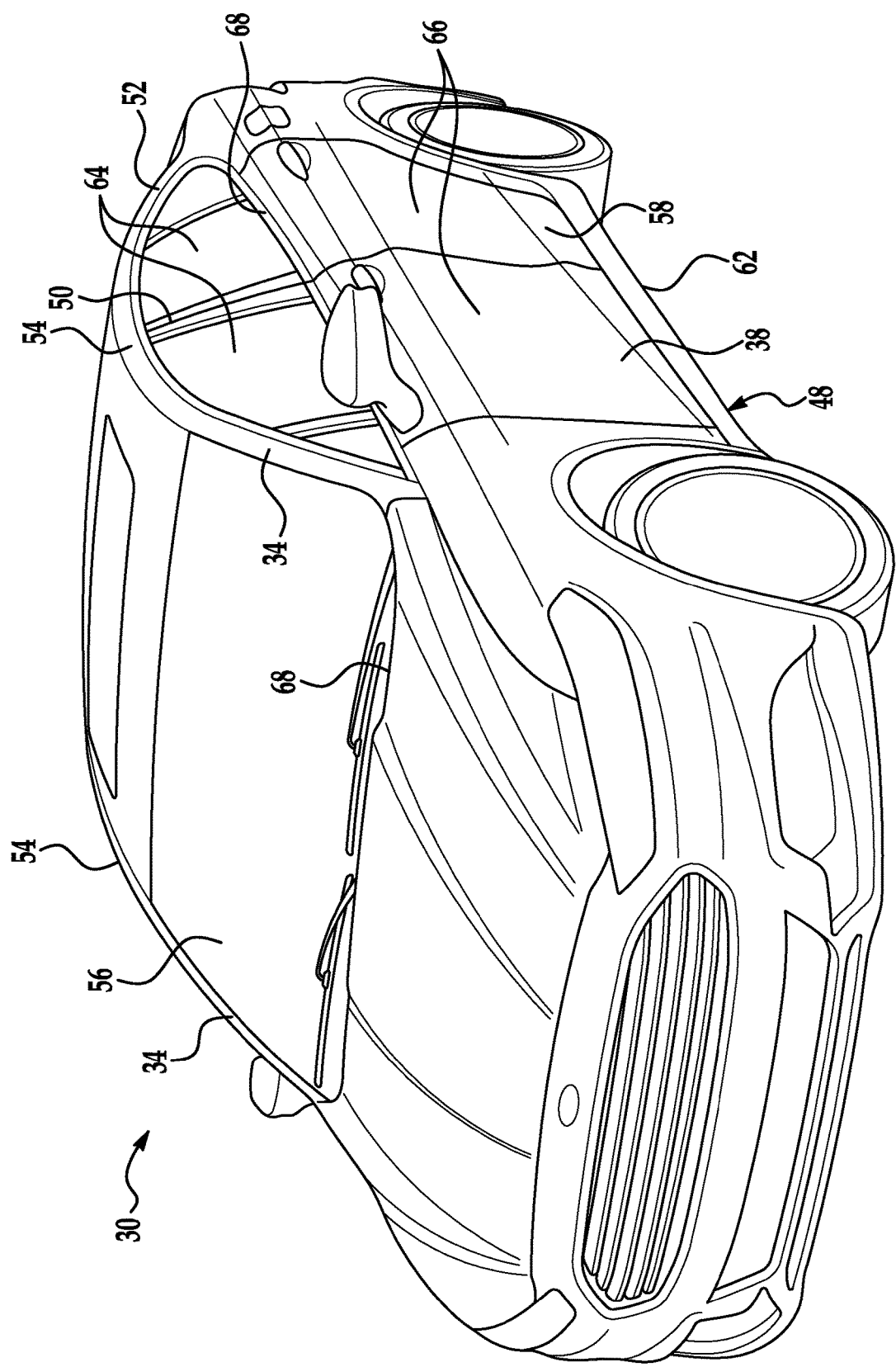
FIG. 1 is a perspective view of a vehicle.

A restraint system includes an A pillar, a dash extending in a cross-vehicle direction from the A pillar, a door extending in a vehicle-rearward direction from the A pillar, and an airbag mounted to the A pillar and inflatable to an inflated position. The airbag includes a side chamber and a front chamber. The side chamber is elongated along the door when the airbag is in the inflated position, and the front chamber is elongated along the dash when the airbag is in the inflated position.

The airbag may be inflatable from an uninflated position, the side chamber may be rolled into a roll extending along the A pillar when the airbag is in the uninflated position, and the front chamber may be rolled into a roll extending along the A pillar when the airbag is in the uninflated position.

The restraint system may further include an inflator fixed relative to the A pillar, and a manifold fluidly coupling the inflator to the side chamber and to the front chamber. The front chamber and the side chamber may be fluidly isolated from each other except via the manifold.

The restraint system may further include a controller communicatively coupled to the inflator and programmed to actuate the inflator in response to a front impact, actuate the inflator in response to a side impact, and actuate the inflator in response to an oblique impact.

The door may define a beltline, and the side chamber may extend both above and below the beltline when the airbag is in the inflated position.

The restraint system may further include a windshield extending upward from the dash, and the front chamber may extend along both the dash and the windshield when the airbag is in the inflated position.

The front chamber and the side chamber may abut each other when the airbag is in the inflated position.

The airbag may include stitching sealing the side chamber and the front chamber from each other. The stitching may be fixed relative to the A pillar.

The front chamber may have an indentation when the airbag is in the inflated position. The restraint system may further include a seat having a midline, and the indentation may be positioned along the midline of the seat when the airbag is in the inflated position.

The indentation may be positioned to receive a head of an occupant in the event of a front impact when the airbag is in the inflated position.

The dash may include a bottom edge at a bottom of the dash and a top edge at a top of the dash, and the dash may extend substantially straight from the bottom edge to the top edge. The restraint system may further include a windshield extending upward from the top edge of the dash, and a floor extending horizontally from the bottom edge of the dash.

The dash may be a structural member of a frame of a vehicle including the restraint system.

The dash may lack a steering wheel.

With reference to the Figures, a restraint system 32 for a vehicle 30 includes at least one A pillar 34, a dash 36 extending in a cross-vehicle direction from the A pillar 34, a front door 38 extending in a vehicle-rearward direction from the A pillar 34, and an airbag 40 mounted to the A pillar 34 and inflatable to an inflated position. The airbag 40 includes a side chamber 42 and a front chamber 44. The side chamber 42 is elongated along the front door 38 when the airbag 40 is in the inflated position, and the front chamber 44 is elongated along the dash 36 when the airbag 40 is in the inflated position.

The restraint system 32 can provide protection for an occupant in a wide variety of impact angles to the vehicle 30. The restraint system 32 provides efficient packaging of components. The restraint system 32 can take advantage of a vehicle 30 in which the dash 36 is flat rather than protruding rearward into a passenger cabin 46.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a frame 48. The vehicle 30 may be of a unibody construction, in which the frame 48 and a body of the vehicle 30 are a single component, as shown in the Figures. The vehicle 30 may, alternatively, be of a body-on-frame construction, in which the frame 48 supports the body that is a separate component from the frame 48. The frame 48 and body may be formed of any suitable material, for example, steel, aluminum, etc.

The frame 48 of the vehicle 30 may include the A pillars 34, B pillars 50, C pillars 52, and roof rails 54. The A pillars 34 may extend between a windshield 56 and the front doors 38. The B pillars 50 may extend between the front doors 38 and rear doors 58. The C pillars 52 may extend between the rear doors 58 and a backlite 60. The frame 48 may also include D pillars (not shown) if the vehicle 30 is, e.g., an SUV, crossover, minivan, or station wagon, in which case the C pillars 52 extend between the rear doors 58 and rear left and right windows (not shown), and the D pillars extend between the rear right and left windows and the backlite 60. The roof rails 54 extend along tops of the doors 38, 58 in a vehicle-rearward direction from the A pillar 34 to the B pillar 50 to the C pillar 52.

The doors 38, 58 extend downward from the roof rails 54 to rocker bars 62. The front doors 38 extend in a vehicle-rearward direction from the A pillars 34 to the B pillars 50. The front doors 38 can be hingedly connected to the frame 48 at the A pillars 34. The rear doors 58 extend in a vehicle-rearward direction from the B pillars 50 to the C pillars 52. The rear doors 58 can be hingedly connected to the frame 48 at the B pillars 50.

The doors 38, 58 each include a side window 64 and a door body 66. The side window 64 can be fully or partially retractable inside the respective door body 66. The door body 66 extends downward from a visible portion of the respective side window 64. The doors 38, 58 define part of a beltline 68 around the vehicle 30. For the purposes of this disclosure, a "beltline" is defined as a bottom edge of visible glass panels of the vehicle 30. For the vehicle 30 as shown in FIG. 1, the beltline 68 is the bottom edge of the visible portions of the windshield 56, the side windows 64, and the backlite 60. For the doors 38, 58, the beltline 68 is the top edge of the door bodies 66.

Figure 2:
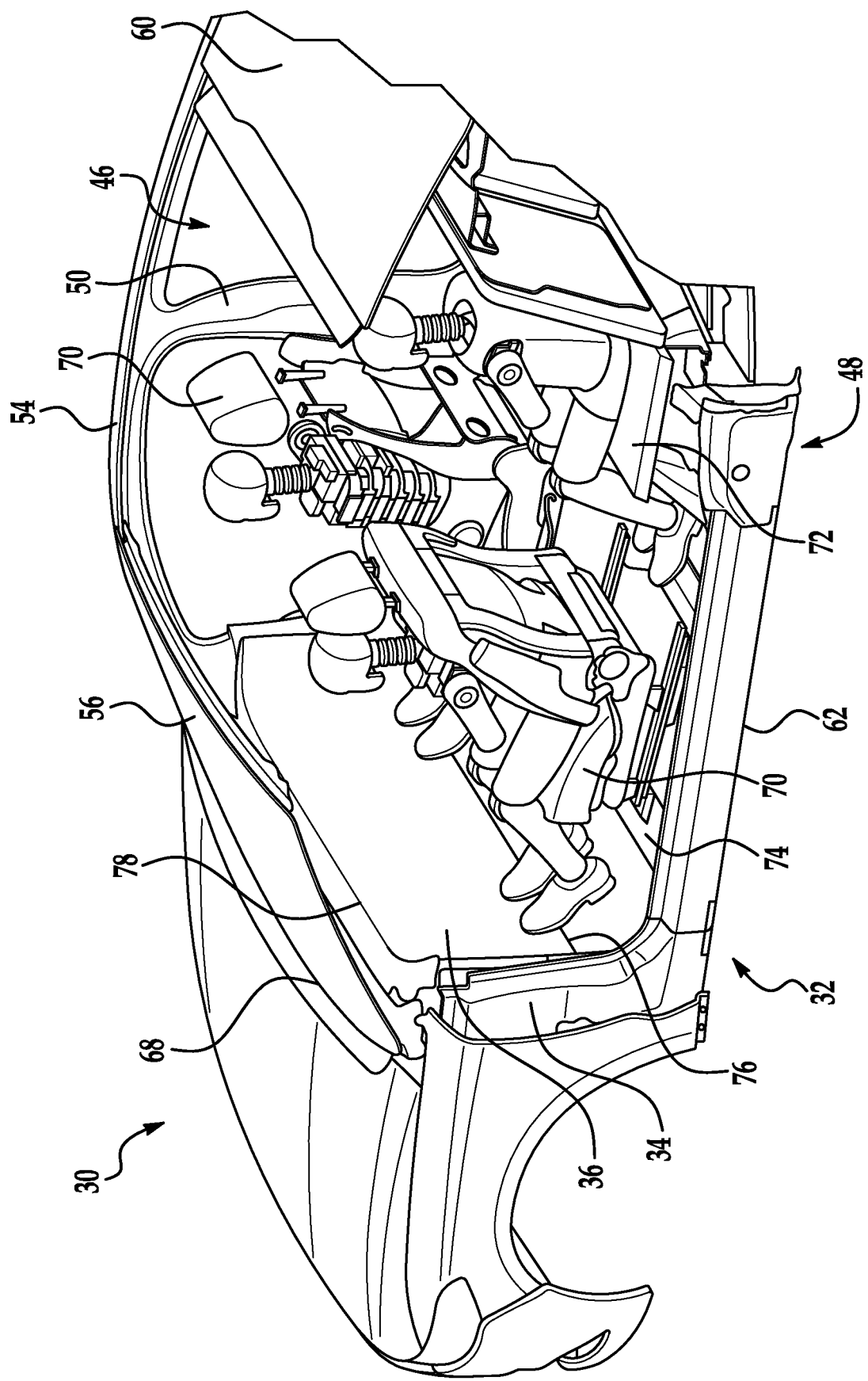
FIG. 2 is a rear perspective view of the vehicle, with a passenger cabin exposed for illustration.

With reference to FIG. 2, the vehicle 30 includes the passenger cabin 46 to house occupants, if any, of the vehicle 30. The passenger cabin 46 includes one or more front seats 70 disposed at a front of the passenger cabin 46 and one or more rear seats 72 disposed behind the front seats 70. The passenger cabin 46 may also include third-row seats (not shown) at a rear of the passenger cabin 46. The seats 70, 72 are indirectly attached to the frame 48 of the vehicle 30, e.g., to the A pillar 34, by a floor 74 of the passenger cabin 46.

The seats 70, 72 are oriented to face in a vehicle-forward direction, i.e., an occupant sitting in the seat 70, 72 is facing in the vehicle-forward direction. Each seat 70, 72 defines a midline, i.e., a plane extending in the vehicle-forward and upward directions and bisecting the seat 70, 72 into generally symmetrical halves. Each seat 70, 72 is generally symmetrical across the midline. In FIG. 2, the front seats 70 are shown to be bucket seats, but the seats 70, 72 may be other types. The position and orientation of the seats 70, 72 and components thereof may be adjustable by an occupant.

With reference to FIG. 3, the dash 36 is disposed at a forward end of the passenger cabin 46 and faces toward the front seats 70. The dash 36 extends in a cross-vehicle direction from one of the A pillars 34 to the other of the A pillars 34. The dash 36 includes a bottom edge 76 and a top edge 78, and the dash 36 extends substantially straight from the bottom edge 76 to the top edge 78. The windshield 56 extends upward from the top edge 78 of the dash 36, and the floor 74 extends horizontally from the bottom edge 76 of the dash 36.

The dash 36 is a structural member of the frame 48. For the purposes of this disclosure, a "structural member" is defined as a portion of a frame of a vehicle that resists static and dynamic forces from operation of the vehicle without undue deflection or distortion. Examples of forces include a weight of other vehicle components, passengers, and cargo; twisting forces caused by driving over uneven surfaces; torque from a transmission; longitudinal and lateral forces from driving; and possibly forces from impacts with other vehicles or impactors.

The dash 36 may include vehicle controls, such as gauges, dials, screens, and information displays; heating and ventilation equipment; a radio and other electronics; etc. The dash 36, as well as the rest of the vehicle 30, lacks a steering wheel and lacks pedals for accelerating and braking. In other words, no steering wheel or pedals for accelerating and braking are supported by or adjacent to the dash 36. More specifically, the vehicle 30 does not include a steering wheel or pedals for accelerating and braking, e.g., is an autonomous vehicle.

With reference to FIGS. 3-7, the vehicle 30 can include two of the airbags 40, each corresponding to one of the A pillars 34. The description below of one of the airbags 40 applies to the other airbag 40 as well. The airbag 40 includes the front chamber 44 and the side chamber 42. The airbag 40 includes stitching 80. The stitching 80 separates the front chamber 44 and the side chamber 42. The front chamber 44 and the side chamber 42 are only connected to each other at the stitching 80. The stitching 80 isolates the front chamber 44 and the side chamber 42; i.e., the stitching 80 prevents gas from flowing from the front chamber 44 to the side chamber 42 and vice versa. The front chamber 44 and the side chamber 42 are fluidly isolated from each other except via a manifold 82, described below.

The airbag 40 may be formed of any suitable airbag material, for example, a woven polymer. For example, the airbag 40 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 3, the airbag 40 is mounted to the A pillar 34. The stitching 80 is fixed relative to the A pillar 34. The stitching 80 is elongated along the A pillar 34. The stitching 80 is located below, e.g., fully below, the beltline 68 of the vehicle 30.

With reference to FIG. 4, an inflator 84 for each airbag 40 is fixed relative to the respective A pillar 34. The inflator 84 can be mounted, e.g., to the dash 36 or to the A pillar 34. Upon receiving a signal from, e.g., a controller 88, the inflator 84 may inflate the airbag 40 with an inflation medium, such as a gas. The inflator 84 may be, for example, a pyrotechnic inflator that uses a chemical reaction to drive inflation medium to the airbag 40. The inflator 84 may be of any suitable type, for example, a cold-gas inflator.

One manifold 82 fluidly couples each inflator 84 to each airbag 40. Specifically, the manifold 82 fluidly couples the inflator 84 to the side chamber 42 and to the front chamber 44. The manifold 82 is positioned and shaped to receive the inflation medium from the inflator 84 and direct the inflation medium simultaneously to both the front chamber 44 and to the side chamber 42. The manifold 82 includes a single inlet and a branching structure to two outlets.

With reference to FIG. 5, the airbag 40 is inflatable from an uninflated position. When the airbag 40 is in the uninflated position, the side chamber 42 is rolled into a roll extending along the A pillar 34, i.e., a centerline of the roll of the side chamber 42 extends along the A pillar 34, and the front chamber 44 is rolled into a roll extending along the A pillar 34, i.e., a centerline of the roll of the front chamber 44 extends along the A pillar 34.

Figure 6:
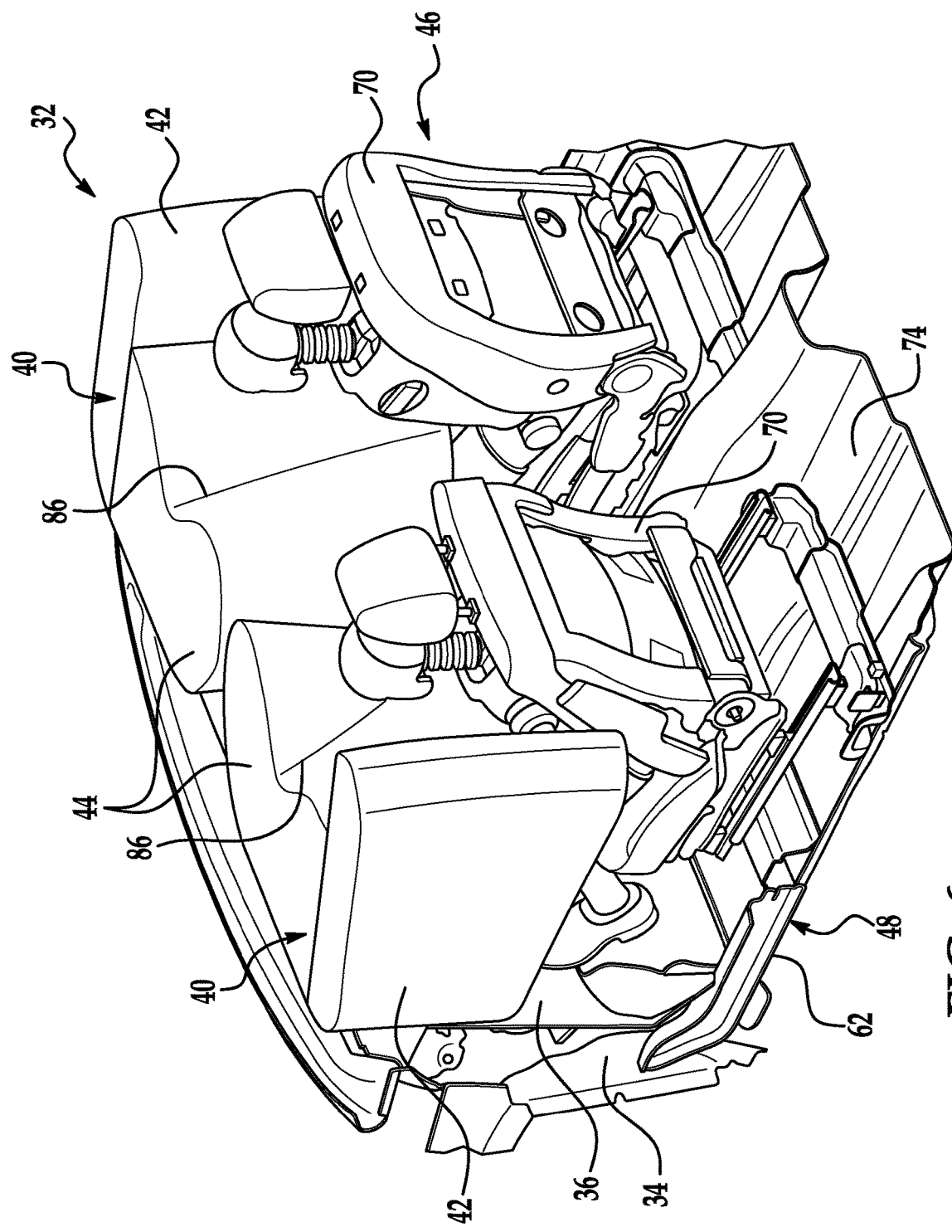
FIG. 6 is a rear perspective view of the passenger cabin of the vehicle with the airbags in an inflated position.

With reference to FIG. 6, the airbag 40 is inflatable to an inflated position. The front chamber 44 of the airbag 40 inflates in a mostly cross-vehicle direction. When the airbag 40 is in the inflated position, the front chamber 44 is elongated along the dash 36. In other words, the longest dimension of the front chamber 44 is along the dash 36, i.e., in a cross-vehicle direction. When the airbag 40 is in the inflated position, the front chamber 44 extends from the A pillar 34 in a cross-vehicle direction at least halfway to, e.g., more than 90% of the distance to, a midline of the vehicle 30. When the airbag 40 is in the inflated position, the front chamber 44 extends along both the dash 36 and the windshield 56; in other words, the front chamber 44 extends above and below the beltline 68.

When the airbag 40 is in the inflated position, the front chamber 44 has an indentation 86. In the event of a front impact, the indentation 86 is positioned to receive a head of an occupant sitting in the front seat 70 that is positioned in a directly vehicle-rearward direction from the front chamber 44. The indentation 86 is positioned along the midline defined by that front seat 70, i.e., the indentation 86 is positioned in a directly vehicle-forward direction from a cross-vehicle middle of that front seat 70.

Figure 7:
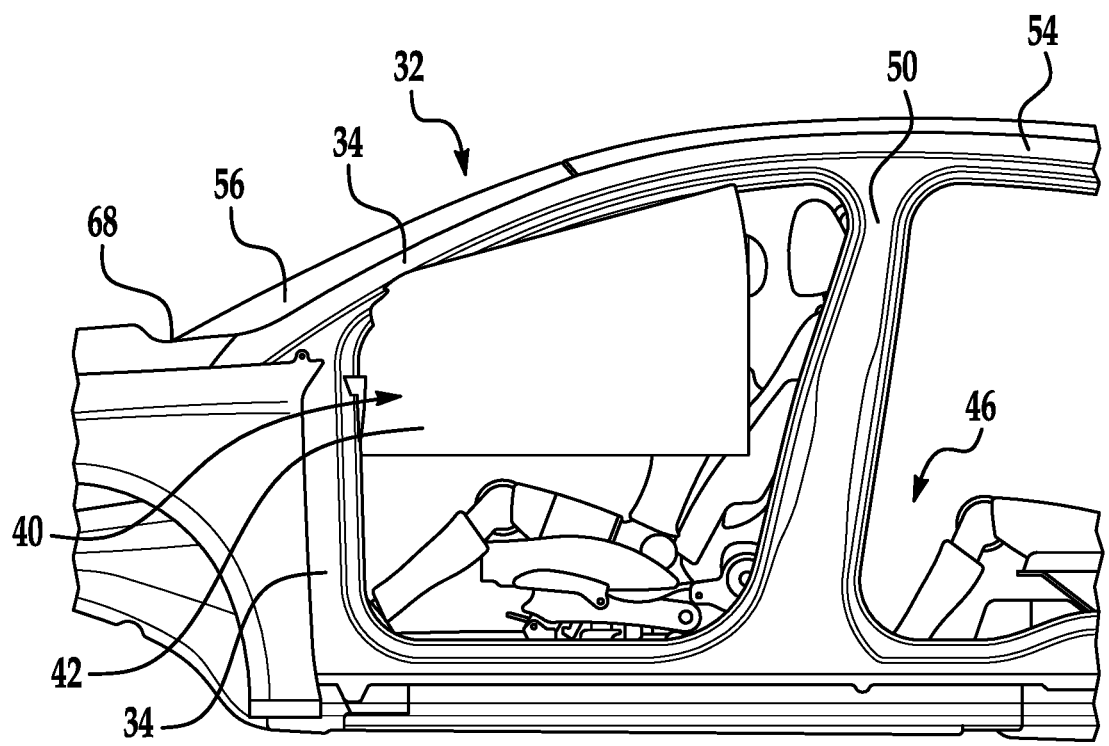
FIG. 7 is a side view of a portion of the vehicle with the airbags in the inflated position, with the passenger cabin exposed for illustration.

With reference to FIG. 7, the side chamber 42 of the airbag 40 inflates in a mostly vehicle-rearward direction. When the airbag 40 is in the inflated position, the side chamber 42 is elongated along the front door 38. In other words, the longest dimension of the side chamber 42 is along the front door 38, i.e., in a vehicle-rearward direction. When the airbag 40 is in the inflated position, the side chamber 42 extends from the A pillar 34 in a vehicle-rearward direction more than halfway to the B pillar 50; the side chamber 42 extends from the A pillar 34 in a vehicle-rearward direction past a position that would be occupied by a head of an occupant sitting in the front seat 70. When the airbag 40 is in the inflated position, the side chamber 42 extends along both the door body 66 and the side window 64 of the front door 38; in other words, the side chamber 42 extends both above and below the beltline 68. When the airbag 40 is in the inflated position, the front chamber 44 and the side chamber 42 abut each other, as shown in FIG. 6.

Figure 8:
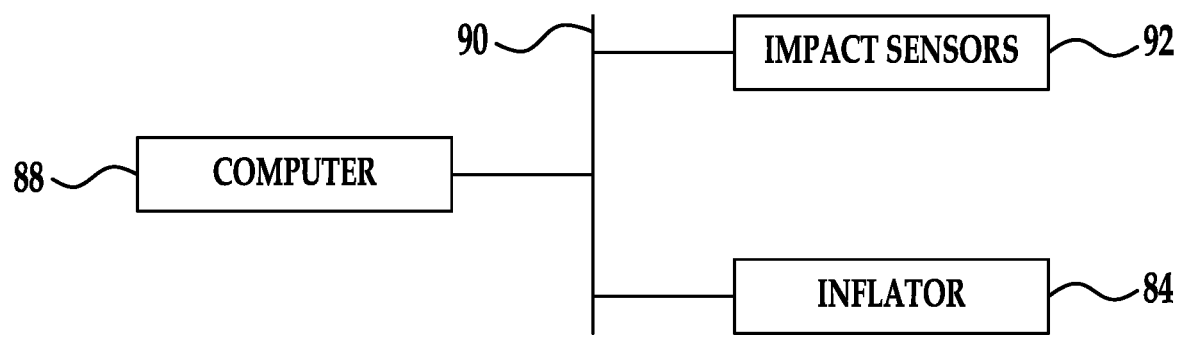
FIG. 8 is a block diagram of a control system for the airbags.

With reference to FIG. 8, the vehicle 30 includes the controller 88. The controller 88 is a microprocessor-based controller. The controller 88 includes a processor, a memory, etc. The memory of the controller 88 includes media for storing instructions executable by the processor as well as for electronically storing data and/or databases.

The controller 88 may transmit and receive data through a communications network 90 such as a controller area network (CAN) bus, Ethernet, WiFi, Local Interconnect Network (LIN), onboard diagnostics connector (OBD-II), and/or by any other wired or wireless communications network. The controller 88 may be communicatively coupled to at least one impact sensor 92, the inflators 84, and other components via the communications network 90.

The impact sensors 92 are adapted to detect an impact to the vehicle 30. The impact sensors 92 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensors 92 may be located at numerous points in or on the vehicle 30.

The controller 88 is programmed to actuate the inflators 84 in response to a front impact, actuate the inflators 84 in response to a side impact, and actuate the inflators 84 in response to an oblique impact. The controller 88 can be programmed to actuate the inflators 84 in response to an impact to the vehicle 30 regardless of the direction of the impact. The programming can be stored in the memory of the controller 88.

In the event of an impact, the impact sensors 92 may detect the impact and transmit a signal through the communications network 90 to the controller 88. The controller 88 may transmit a signal through the communications network 90 to the inflators 84. The inflators 84 may discharge and inflate the airbags 40. The front chamber 44 for each airbag 40 inflates along the dash 36, and the side chamber 42 for each airbag 40 inflates along the front doors 38. The inflation of the airbag 40 causes the front chamber 44 and the side chamber 42 to abut each other. Depending on the direction of the impact, the momentum of the occupant of the front seat 70 carries a head and torso into the front chamber 44, into the side chamber 42, or into both the front chamber 44 and the side chamber 42 at the point at which the front chamber 44 and side chamber 42 abut each other. The airbag 40 can provide supplemental restraint to the occupant.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A restraint system comprising:
   an A pillar;
   a dash extending in a cross-vehicle direction from the A pillar;
   a door extending in a vehicle-rearward direction from the A pillar; and
   an airbag mounted to the A pillar and inflatable to an inflated position;
   wherein the airbag includes a side chamber and a front chamber;
   the side chamber is elongated along the door when the airbag is in the inflated position; and
   the front chamber is elongated along the dash when the airbag is in the inflated position.

2. The restraint system of claim 1, wherein the airbag is inflatable from an uninflated position, the side chamber is rolled into a roll extending along the A pillar when the airbag is in the uninflated position, and the front chamber is rolled into a roll extending along the A pillar when the airbag is in the uninflated position.

3. The restraint system of claim 1, further comprising an inflator fixed relative to the A pillar, and a manifold fluidly coupling the inflator to the side chamber and to the front chamber.

4. The restraint system of claim 3, wherein the front chamber and the side chamber are fluidly isolated from each other except via the manifold.

5. The restraint system of claim 3, further comprising a controller communicatively coupled to the inflator and programmed to actuate the inflator in response to a front impact, actuate the inflator in response to a side impact, and actuate the inflator in response to an oblique impact.

6. The restraint system of claim 1, wherein the door defines a beltline, and the side chamber extends both above and below the beltline when the airbag is in the inflated position.

7. The restraint system of claim 1, further comprising a windshield extending upward from the dash, wherein the front chamber extends along both the dash and the windshield when the airbag is in the inflated position.

8. The restraint system of claim 1, wherein the front chamber and the side chamber abut each other when the airbag is in the inflated position.

9. The restraint system of claim 1, wherein the airbag includes stitching sealing the side chamber and the front chamber from each other.

10. The restraint system of claim 9, wherein the stitching is fixed relative to the A pillar.

11. The restraint system of claim 1, wherein the front chamber has an indentation when the airbag is in the inflated position.

12. The restraint system of claim 11, further comprising a seat having a midline, wherein the indentation is positioned along the midline of the seat when the airbag is in the inflated position.

13. The restraint system of claim 11, wherein the indentation is positioned to receive a head of an occupant in the event of a front impact when the airbag is in the inflated position.

14. The restraint system of claim 1, wherein the dash includes a bottom edge at a bottom of the dash and a top edge at a top of the dash, and the dash extends substantially straight from the bottom edge to the top edge.

15. The restraint system of claim 14, further comprising a windshield extending upward from the top edge of the dash, and a floor extending horizontally from the bottom edge of the dash.

16. The restraint system of claim 1, wherein the dash is a structural member of a frame of a vehicle including the restraint system.

17. The restraint system of claim 1, wherein the dash lacks a steering wheel.

* * * * *